United States Patent Office 3,496,245
Patented Feb. 17, 1970

3,496,245
PROCESS FOR RECOVERY OF HIGH-PURITY LIGANDS BY SORPTION IN CUPROUS HALIDE PROTECTED BY CERTAIN AMIDES
Richard Joseph DeFeo and Jesse Metteau Carr, Jr., Baton Rouge, and Gerald Albert Byars, Denham Springs, La., assignors to Esso Research and Engineering Company, a corporation of Delaware
No Drawing. Filed Jan. 10, 1967, Ser. No. 608,251
Int. Cl. C07c 11/12, 11/14
U.S. Cl. 260—677   51 Claims

ABSTRACT OF THE DISCLOSURE

Butadiene or other ligand is recovered in high purity e.g., extremely low vinylacetylene content) by sorbing in porous cuprous halide particles which contain a contaminant-excluding material such as dimethyl formamide and N-methyl pyrrolidone. The process is also effective for high purity isoprene and for rejecting acetylene from ethylene, allene from propylene, and ethylbenzene from styrene.

---

This invention is directed to (1) an improved sorbent-based process for selectively recovering complexable ligands capable of preferentially forming stable complexes with selected cuprous halide (Cl, Br, or I) sorbent solids by contacting a feed containing said ligand along with close-boiling, difficult-to-remove, cocomplexable contaminants with said cuprous halide sorbent solids to effect complexation (either vapor or liquid phase) of said ligand with said sorbent in the presence of a select material capable of substantially rejecting undesired closely complexable contaminants which (once having complexed with the sorbent) are extremely difficult to remove from the recovered (and otherwise highly purified) product ligand which is obtained upon desorption (decomplexation) of said sorbent solids; and (2) a purity enhancing composition of matter comprising said cuprous halide sorbent solids in close association with the contaminant-excluding material (to be described hereinbelow) with or without an inert slurry diluent. Moreover, said contaminant-excluding material is one which: (a) is substantially inert, viz., is free from deleterious interference with the preferential complexation of the ligand to be recovered, (b) does not destroy or hinder the complexing capacity or activity of said sorbent in the concentrations at which the composition is highly effective in promoting contaminant rejection, (c) is inert to reaction with the ligand being recovered so that its chemical identity is not changed, and (d) is readily separable from the purified product ligand, e.g., by simple flashing or other straight forward distillation procedures. Said contaminant-excluding material is selected from the group consisting of:
(A) compounds of the formula:

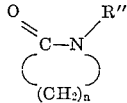

where R" is a $C_1$ to $C_{12}$ alkyl group and $n$ is an integer of from 2 to 12;
(B) compounds of the formula:

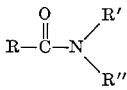

where R and R' are selected from the group consisting of hydrogen and $C_1$ to $C_{18}$ alkyl groups and R" is a $C_1$ to $C_{18}$ alkyl group; and
(C) mixtures containing (A) and (B).

According to a preferred embodiment of this invention, compound (B) is a N,N-di-$C_1$ to $C_4$ alkyl amide of an alkanoic acid having from 1 to 18 carbon atoms and compound (A) is a N-$C_1$ to $C_4$ alkyl pyrrolidone.

In sorbent-based recovery procedures employing cuprous halides sorbent, e.g., cuprous chloride, to recover complexable ligands from feed streams containing them; great difficulty is encountered in securing removal of troublesome, closely cocomplexable contaminants from the feed stream, especially when the tolerable concentration of such a contaminant in the recovered product ligand is very low for high purity requirement utilities. For example, in order to effectively utilize recovered 1,3-butadiene for carefully controlled polymerization reactions, it should contain less than about 200 parts per million (p.p.m.) vinyl acetylene, and preferably less than 100 p.p.m. vinyl acetylene. In fact, some 1,3-butadiene utilities even require less than 50 p.p.m. vinyl acetylene. While methyl acetylene and ethyl acetylene should also be excluded in polymerization high grade 1,3-butadiene, the vinyl acetylene is the most troublesome contaminant because even in comparatively low concentrations, e.g., 300 p.p.m., it can cause premature polymerization of the butadiene, result in low yields of the desired molecular weight polymer, and otherwise disrupt the desired polymerization reactions involving 1,3 - butadiene. While methyl and ethyl acetylenes can be substantially excluded by liquid phase slurry complexing and slurry desorption procedures using cuprous chloride sorbents, such procedure is not always sufficiently selective, by itself, in rejection of the troublesome vinyl acetylenes to allow direct use of the recovered purified polymerization grade 1,3-butadiene by even the highly efficient cuprous chloride ligand recovery slurry procedures. This is especially true in cases where butadiene-1,3 is recovered from feed streams having a high concentration of vinyl acetylene. Consequently, additional feed pretreating and/or product ligand post-treating procedures are frequently employed, e.g., hydogenation of feed or product butadiene, to convert the vinyl acetylene to other materials, e.g., 1,3-butadiene or ethyl acetylene, the latter which is not nearly as closely complexable with the cuprous chloride sorbents as the ligand sought to be recovered, e.g., 1,3-butadiene. Moreover, the use of such pretreating or post-treating procedures increases the overall recovery costs and detracts from the otherwise substantial benefits attained by sorbent-based ligand recovery procedures.

Other troublesome contaminants which complicate straight forward recovery of the respective cuprous halide complexable product ligands, which can be cited as illustrative, include the following:

Product ligand recovered:   Contaminant
　Ethylene_____ Acetylene and carbon monoxide.
　Allene_____ Methyl acetylene.
　Propylene_____ Methyl acetylene.
　Acrylonitrile_____ Acetonitrile.
　Isoprene_____ Vinyl acetylene and ethyl
　　　　　　　　　acetylene.

While most of these contaminants do not present as troublesome a removal problem as involved in excluding vinyl acetylene from the 1,3-butadiene product ligand, nevertheless it is highly desirable to improve the exclusion of such materials from their respective product ligands when recovered by sorbent-based cuprous halide recovery procedures. Consequently, it is the main objective of this invention to improve the product ligand purity by exclusion or rejection of otherwise difficult to remove, close boiling, closely cocomplexable contaminant materials from the recovered product ligand obtained by sorbent-based vapor phase and liquid phase ligand recovery procedures involving the use of the abovementioned selected cuprous halide sorbents.

An outstanding feature of the present invention is that it allows significant improvements in the selectivity for recovering the desired complexable ligand when said cuprous halide sorbents are employed in sorbent-based ligand recovery procedures, while maintaining high sorbent sorptive capacity. Moreover, the present invention has the added beneficial features that its does not detract from the complexing rate, viz., the rate at which the product ligand is selectively removed from the feed stream, nor does it detract from the activity of the cuprous halide sorbent particles, viz., the ability of said sorbent particles to repeatedly remove complexable ligands over extended time periods. In short, the present invention overcomes drawbacks previously associated with sorbent-based ligand recovery procedures employing cuprous halide sorbents, but does not detract from sorbent complexing capacity, activity, or complexing rate.

While the reasons for the achievement of the above benefits secured by the present invention are not entirely understood, it can be theorized that the use of the contaminant-rejecting material during the complexing blocks cupric ion sites on the cuprous halide sorbent particles. During sorbent usage, it has been discovered that a certain portion of the cuprous halide is oxidized to the cupric valence state and these cupric sites on the sorbent are suspected to enhance the complexation with the closely complexable contaminant materials present in the feed stream. Thus, for example, it has been discovered that the presence of varying amounts, e.g., 2 to 10 wt. percent, of the cupric valence sites as halide or oxide, in the cuprous halide sorbent particles causes a higher concentration of vinyl acetylene to be cocomplexed with 1.3-butadiene in cuprous halide sorbent-based 1,3-butadiene recovery procedures. The complexed vinyl acetylene therefore is present in the product 1,3-butadiene recovered from the sorbent by decomplexation (desorption) thereof. It should be understood clearly, however, that the present invention is in no way limited upon this or any other theory for the successful operation thereof, since by the use of the selected contaminant-rejecting material complexation, the beneficial results referred to hereinabove are readily secured. Consequently, the present invention is not dependent upon theory for the operation thereof.

One salient observation concerning the close affinity of the contaminant rejecting material (A) and (B) for the cuprous halide sorbent solids is that said contaminant rejector appears to be intimately associated with the sorbent solids throughout processing. Samples of sorbent taken during complexing, stripping and decomplexing reveal a fairly constant concentration of the contminant rejector which could indicate selective complexation with those sites on the sorbents, perhaps cupric ion sites, which would otherwise complex preferentially with vinyl acetylene contaminant.

Suitable exemplary contaminant-rejecting materials coming within the Formula A include, but are not limited to, the following: N-methyl pyrrolidone, N-ethyl pyrrolidone, N-propyl pyrrolidone, N-butyl pyrrolidone, N-amyl pyrrolidone, N-hexyl pyrrolidone, N-decyl pyrrolidone, N-undecyl pyrrolidone, N-dodecyl pyrrolidone, N-methyl - B-propiolactam, N-ethyl-B-propiolactam, N-decyl-B-propiolactam, N-methyl-W-caprolactam, N-ethyl-W-caprolactam, N-decyl-W - caprolactam, N-methyl-W-decanolactam, N-methyl-W-dodecanolactam, and mixtures of any two or more of the above.

Suitable exemplary contaminant-rejecting materials coming within the Formula B include, but are not limited to, the following: N-methyl formamide, N-ethyl, formamide, N-propyl formamide, N-butyl formamide, N-amyl formamide, N-hexyl formamide, N-decyl formamide, N-dodecyl formamide, N,N-dimethyl formamide, N,N-diethyl formamide, N,N-di-n-propyl formamide, N,N-di-n-butyl formamide, N,N-diamyl formamide, N,N-dihexyl formamide, N,N-didecyl formamide, N,N-didodecyl formamide, N-methyl-N-ethyl formamide, N-methyl-N-propyl formamide, $C_1$ to $C_{18}$ mono- and di-alkyl caproamides, e.g., N-methyl caproamide, N,N-dimethyl caproamide, N-dodecyl caproamide, N,N-didodecyl caproamide, N,N-dimethyl caprylamide, N,N-dimethyl caproamide, N,N-dimethyl lauramide, N,N-dimethyl palmitamide, N,N-dimethyl oleamide, N,N-dimethyl heptadecylamide, N,N-dimethyl octadecylamide, and mixtures of any two or more of the above.

Of course, mixtures containing any one or more of the suitable exemplary materials specified hereinabove with respect to (A) and/or (B) can likewise be employed in accordance with this invention. For example, a very suitable mixture of (B) materials for vinyl acetylene rejection in a 1,3-butadiene recovery process is a mixture of N,N-dimethyl caprylamide and N,N-dimethyl caproamide.

The concentration of the said contaminant-rejecting materials to be employed in accordanace with the improved process of this invention can range from 0.001 to 10 wt. percent, based on the amount of said cuprous halide sorbent present. Hence, from a compositional standpoint, the present invention envisions the use of slurry recovery purity enhancing compositions of matter comprising an inert liquid diluent and cuprous halide (Cl,Br or I) sorbent solids having in intimate association therewith from 0.001 to 10.0 wt. percent of a contaminant-rejecting composition (A) and/or (B), based on the amount of said cuprous halide sorbent solids present in the slurry. Of course, in non-slurry, vapor phase ligand recovery procedures the purity enhancing compositions do not contain such a liquid diluent and are composed of the said cuprous halide sorbent solids and the contaminant rejecting composition (A) and/or (B) in intimate association therewith. In the latter (vapor phase) case these purity enhancing compositions consist essentially of 90 to 99.999 wt. percent of said cuprous halide sorbent solids and 0.001 to 10.0 wt. percent of said contaminant rejecting material in intimate association therewith. Usually, however, the concentration of the contaminant-rejecting material ranges from about 0.01 to 3 wt. percent, based on the amount of the cuprous halide present; and preferably sufficient amounts of the contaminant-rejecting material are used to insure adequate rejection of the closely cocomplexable contaminant material. When conducting slurry recovery processes, in order to avoid localized copper plate out on conventional steel reactors, the solubility limits of the slurry diluent for a given specific contaminant rejector should be observed to avoid localized electrolytic reduction of the cuprous halide to metallic copper caused by localized build-up of insoluble, excess amounts of polar amide materials. By "excess amounts" is meant those amounts not tightly bound or intimately associated with the cuprous halide sorbent solids. For most cases the preferred concentration of the contaminant-rejecting material (A) and/or (B) ranges from about 0.1 to 2 wt. percent, based on the amount of the cuprous halide present.

The copper plating, due to any localized build-up of excess amounts of the contaminant rejector (A) and/or (B) which are insoluble in the slurry diluent, is not to be confused with gross disproportionation of cuprous halide sorbent to cupric chloride and metallic copper which is promoted by basic nitrogen compounds, e.g., organic amines. Because of their marked tendency to promote gross disproportion of the cuprous halide sorbents, coupled with their inefficiency as contaminant rejectors, organic amines should not be employed.

As noted hereinabove, the complexing can be conducted either in the vapor or liquid phase. When the complexing is conducted in the vapor phase, the selected cuprous halide sorbent particles can be arranged in the form of a fixed bed, fluidized bed (wherein a portion of the purified ligand being recovered, nitrogen or other inert gas is used as the fluidizing gas), or the cuprous halide sorbent particles can be fluidized in a transfer line or similar equivalent form of fluidization vessel. The feed stream containing the ligand to be recovered is then passed into contact with the cuprous halide sorbent particles, and the contact to effect complexation is conducted at vapor phase conditions. The specific temperature and pressure conditions employed for vapor phase complexing will depend largely upon the composition of the ligand-containing feedstream and the specific ligand being recovered therefrom. For example, when the ligand to be recovered is 1,3-butadiene and the feed stream is comprised largely of a mixture of 1,3-butadiene with butenes (butene-1 and isobutylene) vapor phase complexation can be effected readily at temperatures of 35 to 120° F. and corresponding pressures of 0 to 90 p.s.i.g. The complexing is conducted for a sufficient period of time to complex substantially all of the available ligand contained in the feed stream. The contaminant-rejecting material is usually coated on to the selected cuprous halide sorbent particles by any convenient coating procedure whereby said material can be applied to said sorbent particles, e.g., spraying, dipping or immersing the sorbent particles into a solution of the contaminant-rejecting composition, etc. (any procedure being capable of employment which insures adequate deposition of a sufficient amount of said contaminant-rejecting material to effectively enhance the rejection of the contaminating, closely co-complexable ligand contained in the feed stream). Also, care should be exercised to maintain the above-mentioned sufficient concentration of the contaminant-rejecting material throughout complexing. The maintenance of the adequate concentration of the contaminant-rejecting material, e.g., from 0.001 to 10 wt. percent based on the amount of cuprous halide present, can be assured by repeatedly withdrawing a portion, or all, of the cuprous halide sorbent particles from the vapor phase complexing and recoating them with the contaminant-rejecting composition, when necessary. Alternatively, the contaminant-rejecting material can be introduced into the complexing zone, e.g., by spraying therein (in the case of vapor phase complexing) or adding it to the sorbent-diluent slurry (in slurry complexing), so as to insure adequate concentrations thereof, either directly on the cuprous halide sorbent particles or in intimate contact therewith to enable the sorbent solids to "pick-up" the contaminant rejector. Hence, the contaminant-rejecting material can be incorporated into and passed with the feed, e.g., in cases where the feed is passed into the vapor phase complexing zone in liquid or spray form.

According to a preferred embodiment of the present invention, where the complexing is conducted vapor phase, the selected cuprous halide sorbent particles are employed in highly porous form, viz., said particles have a porosity of above about 10% (of the total volume of a particle) 550 to 10,000 A. pores. Such porous cuprous halide sorbent particles are highly sorption-active, and their use is greatly preferred in vapor phase complexing operations.

These highly porous cuprous halide sorbent particles can be prepared readily in accordance with the procedures indicated in U.S. Ser. Nos. 333,925 and 333,926, filed on Dec. 23, 1963, both now abandoned, and the disclosure of said applications is incorporated herein by reference. Basically, the porosity is imparted to raw cuprous halide salts by contacting said salts with a conditioning ligand at complexing conditions followed by desorption of the complex which results in activating the cuprous halide sorbent particles by imparting a high degree of porosity thereto. The conditioning ligand employed is one which is capable of forming a greater than 1:1 mol ratio stable complex with the selected cuprous halide salt, viz, wherein the complex has a mol ratio of copper to complexing (conditioning) ligand of greater than 1:1. The complexing operation imparts to the raw cuprous halide salt the requisite porosity upon decomplexing thereof. The decomplexing is usually conducted thermally by heating the previously complexed raw salt to thermally dissociate the complex therefrom, thus leaving the sorption-active highly porous cuprous halide sorbent particles. Basically, the procedures of the abovementioned Ser. Nos. 333,925 and 333,926 involve either dissolving raw cuprous halide salts in a suitable solvent, or forming an aqueous or other slurry thereof, followed by complexing the dissolved or slurried particles with a conditioning ligand capable of forming a stable copper-ligand complex having a mol ratio of copper to complexing ligand of greater than 1:1.

If the copper-conditioning ligand complex is formed from a solution of the cuprous halide salt, the cuprous halide solution is usually prepared by dissolving the raw cuprous halide salt in $C_4$ to $C_{12}$ monoolefin solvent at temperatures ranging from about $-40°$ F. to about $140°$ F. accompanied by stirring or other agitation to insure adequate dissolving of the salt in the solvent. The thus formed solutions are then filtered to remove insolubles prior to complexing and decomplexing as mentioned above. Whether the sorption-active highly porous cuprous halide sorbent particles employed are prepared by the solution or slurry procedures of Ser. Nos. 333,925, 333,926, or any other suitable method, it is preferable to employ conditioning ligands which form a stable complex having a mol ratio of copper to conditioning ligand of 2:1 or even higher. Such compounds include both materials which form only complexes having said ratios of copper to complexing compounds greater than 1:1 and also compounds which form complexes having a ratio of 1:1 or less, which upon decomplexing pass through a stable complex having a ratio of copper to complexing compound greater than 1:1, and preferably of 2:1 and even higher as indicated above. Thus, certain materials, e.g., nitriles, diolefins, acetylenes, carbon monoxide, etc., under ordinary conditions forming a 2:1 complex can be made to complex in ratios of copper to conditioning ligands of 1:1 or less. However, upon dissociation, complexing material is released selectively from a bed of cuprous halide until the stable complex, viz, the complex having a copper to conditioning ligand mol ratio above 1:1, e.g., 2:1 stoichiometric complex is completely formed before further decomplexing to the uncomplexed (highly porous) cuprous halide sorbent particles occurs. In this regard by "stable" complex is meant a stoichiometric complex stable upon dissociation as described in the preceding sentence. Such "conditioning ligands" which can be employed to prepare the highly porous halide sorbent particles preferred for use when the complexing is conducted vapor phase in accordance with this invention include, but are not limited to, the following conditioning ligands: $C_3$ to $C_{10}$ conjugated and nonconjugated aliphatic, cyclic, and alicyclic polyolefins, e.g., butadiene-1,3, isoprene, piperylene, allene, octadiene, cyclohexadiene, cyclooctadiene, cyclododecyltriene, $C_2$ to $C_{10}$ aliphatic and alicyclic unsaturated or saturated nitriles, e.g., acetonitrile, acrylonitrile, propronitrile, methacrylonitrile, ethacrylonitrile, etc.; carbon monoxide; HCN; etc. Of course, more than one of these functional groups can be present in a single molecule of "conditioning ligand."

In conducting vapor phase complexing operations using the highly porous, sorption-active, cuprous halide sorbent particles prepared as noted above, a substantial portion, e.g., usually at least 25 wt. percent of the total amount of cuprous halide solid sorbent particles are the highly porous materials having a porosity of above about 10% (of the total volume of a particle) 550 to 10,000 A. pores, as determined by mercury porosimeter measurements. Preferably, at any given point during the vapor phase complexation, the concentration of these highly porous cuprous halide particles ranges from about 50 to 99+% by weight, based on the total amount of solid cuprous halide particles present. The sorptive capacity of these highly porous particles usually ranges from about 35 to 99+% and more preferably from about 50 to 99+%, based on the theoretical capacity for sorption of the ligand being recovered. For example, if the ligand being recovered is 1,3-butadiene, the theoretical sorptive capacity will depend upon the stoichiometric ratio in which the 1,3-butadiene complexes with the cuprous halide. Thus, one mol of 1,3-butadiene complexes with two mols of cuprous chloride.

As noted hereinabove the complexing between the cuprous halide sorbent particles and the complexable ligand contained in the feed stream can also be, and preferably is, conducted at liquid phase complexing conditions. Any temperature and pressure conditions sufficient to effect liquid phase formation of a solid, insoluble cuprous halide-recoverable ligand complex can be employed when conducting the complexation in the liquid phase. According to a preferred embodiment of this invention, liquid phase complexing is conducted by slurry complexing procedure wherein the cuprous halide sorbent particles, either in highly porous form or in the form of raw salt particles, are slurried in an essentially anhydrous organic liquid diluent having a boiling point higher than the boiling point of the complexable ligand to be recovered, followed by desorption of the cuprous halide-ligand complex in the presence of said organic liquid diluent to recover said ligand. Usually, the desorption is conducted by heating the complexed particles while in the presence of the organic liquid diluent to thermally dissociate the complexed ligand therefrom. According to one of the more preferred embodiments of this invention involving liquid phase slurry complexing to recover the ligand from the feed stream, the liquid phase slurry complexation is conducted in a plurality of slurry-contacting steps sequentially performed with each succeeding liquid phase complexing being conducted at a lower temperature than the preceding one and with all of said steps being conducted in the presence of the organic liquid diluent. In such temperature staged liquid phase slurry complexing operations, it is usually desired to conduct as much of the complexation as possible in the first (higher) temperature complexing stage, as this enhances product purity of the ligand being recovered.

The organic liquid slurry diluent employed when conducting the complexing liquid phase is one which is either inert to reaction with the cuprous halide particles or, if complexable therewith, is less preferentially complexable than the ligand being recovered and contains no bulk water. For example, where the ligand to be recovered is ammonia, a slurry of cuprous chloride solids is acetonitrile can be used because ammonia is more preferentially sorbed by the cuprous chloride than is acetonitrile. The inert or less preferentially sorbed organic liquid slurry diluent can be any anhydrous organic liquid diluent which has a boiling point above the boiling point of the complexable ligand recovered from the feed stream and does not form preferentially a stable complex with the cuprous halide particles at complexing conditions. Also, however, it is preferable that the organic liquid diluent have a boiling point higher than any component in the feed stream, although this latter preferable limitation is not an absolute requirement. The specific organic liquid diluent or diluent mixture employed in a given case will, of course, depend upon the ligand being recovered and the components of the particular feed stream from which it is recovered. Bearing this in mind, usually the organic liquid diluent boils above 10° F., melts below 70° F., has a low viscosity at operating temperatures, dissolves less than about 5%, preferably less than 1%, of either said cuprous halide sorbent particles or the ligand complexes thereof, and can be separated readily from the product recovered ligand in the final recovery procedure (as well as from any other feed components), preferably by simple distillation or flashing procedures to remove the desorbed product ligand from the organic liquid diluent-cuprous halide particle slurry. Suitable organic liquid slurry diluents which can be employed include, but are not limited to, the following materials, isomers, blends, and mixtures thereof: paraffin hydrocarbons having at least one carbon atom more than the ligand being recovered from the feed, e.g., $C_3$ to $C_{12}$ paraffins and cycloparaffins, esp., propane, n-butane, isobutane, n-pentane, isopentane, methyl cyclopentane, n-hexane, isohexane, cyclohexane, n-heptane, methyl cyclohexane, isoheptane, n-octane, iso-octane, n-nonane, n-decane, n-undecane, n-dodecane, or higher, as well as mixtures and isomers thereof, e.g., narrow boiling naphthas corresponding in carbon number content to $C_3$ to $C_{12}$ paraffins, individually or in admixture (of these the $C_{5+}$, e.g., the $C_5$ to $C_{12}$ paraffins are preferred); $C_6$ to $C_{12}$ monocyclic aromatics, including alkylated monocyclic aromatic hydrocarbons containing from 1 to 6 alkyl substituent carbon atoms, e.g., benzene, toluene, xylenes, ethyltoluenes, cymene, cumene, etc.; other aromatics including those containing an excess of 12 carbon atoms, such as bicyclic, tricyclic, and tetracyclic compounds, including, but not limited to, methylnaphthalenes and polymethylanthracenes and phenanthrenes; and, of course, any less preferentially sorbed organic material having the physical properties specified herein, e.g., acetronitrile, allylchloride, allylbromide, carbontetrachloride, ethylchloride, ethylbromide, ethylenedischloride, ethylenedibromide, propylchloride, propylbromide, butyfluoride, butylchloride, butylbromide, anmylfluoride, amylchloride, amylbromide, etc., as well as mixed halides such as difluorodichloromethane, ethane, etc. Likewise, less preferentially sorbed monoolefin organic liquid diluents can be used, e.g., higher boiling less preferentially complexable $C_{4+}$ monoolefins, such as butene-1, isobutylene (where the ligand being recovered is ethylene), pentene-1, hexene-1, heptene-1, 2,2,4-trimethylpentene-1, 2,2,4-tmiethylpentene-2, octene-1, nonene-1, decene-1, undecene-1, 5-methyldecene-1 dodecene-1, as well as isomers and mixtures containing any two or more thereof.

When the liquid phase complexation is conducted with the cuprous halide particles in slurry, the working slurry can be prepared readily by adding the cuprous halide raw salt particles to the organic liquid diluent and stirring to insure adequate contact of the solid salt particles with a ligand-containing feed. The term cuprous halids "sorbent solids" as used herein includes raw cuprous halide salt. The feed can be passed into contact with the cuprous organic liquid diluent slurry with the feed either in gaseous or liquid form, and agitation of the slurry, by stirring thereof, is usually accomplished throughout liquid phase slurry complexing operations. The cuprous halide sorbent particles employed should be substantially anhydrous, high purity, viz, 95+% pure commercial cuprous chloride, cuprous bromide, or cuprous iodide salts, containing less than about 0.8% moisture and essentially no bulk water. The preferred cuprous halide sorbents are cuprous chloride salts which are 99+% pure cuprous salt, which is essentially moisture-free, viz, contains less than about 0.5 wt. percent moisture (based on dry cuprous chloride).

Usually in slurry operations the slurry contains from 10 to 65 wt. percent of cuprous halide sorbent solids, based on the total of slurry solids and liquids. The cuprous halide sorbent solids can range in size from 0.05 to about 400 microns with usual average particle sizes ranging from 0.1 to 250 microns and preferably from >0.1 microns to <200 microns.

When the complexing is conducted liquid phase, e.g., via slurry complexing, the contaminant-rejecting material can be added to the organic liquid diluent, for example, by mixing the contaminant-rejecting liquid material in liquid form with the organic liquid diluent before the sorbent solids are added thereto to form the slurry; or it can be added to the sorbent solids-diluent slurry; or it can be applied to the cuprous chloride salt particles prior to their admixture with the slurry organic liquid diluent. Alternatively, the contaminant-rejector can be added to the feed. No particular procedure need be observed for incorporating the contaminant-rejecting material into the slurry, and any convenient suitable procedure will suffice, the important consideration being that the contaminant-rejecting material is present during complexing in sufficient amounts to enhance rejection of the closely boiling, closely cocomplexable contaminating ligands.

Subsequent to the complexation, the cuprous halide-ligand complex is desorbed to release the recovered product ligand in high purity. While it is not necessary for the contaminant-rejecting material to be present during desorption, usually it is desirably present due to its close affinity for said cuprous halide sorbent solids. The important point here is that once the contaminant-rejecting material has prevented the complexation of the contaminant ligand with the cuprous halide sorbent during complexing of the product ligand from the feed stream, it has effectively excluded the contaminant ligands from the recovered ligand obtained upon desorption of the cuprous halide-ligand complex. However, as mentioned above, usually it is desirable and convenient that the contaminant-rejecting material be present also during desorption. This will, of course, be the case when the complexing is done by liquid phase slurry complexing procedures. In the latter regard, the concentration of the contaminant-rejector during desorption will very likely be approximately the same as that present during complexing.

As noted hereinabove, desorption can be conducted conveniently by heating the complexed particles to thermally release the recovered ligand therefrom in very high purity (compared to that concentration and purity in which it was present in the feed stream). Any desorption conditions can be used which do not thermally destroy the ligand being recovered or severely anneal the cuprous halide sorbent particles so as to render them substantially incapable of further use in recovering more ligands from the feed stream. The specific temperatures and pressures used for desorption will depend upon the specific complex being desorbed as well as other factors, e.g., the specific organic liquid slurry diluent or diluent mixture, etc.

Subsequent to complexation and prior to desorption, the complexed cuprous halide particles can be stripped to remove undesirable materials which boil lower than the diluent. Stripping can be conducted to remove these less complexable, lower boiling materials by contacting the complexed particles with a stripping medium. Thus, when either vapor phase or liquid phase complexing and desorption are employed, a stripping gas, e.g., comprising the very ligand being recovered selectively in high purity from the feed stream, can be used. Thus, when the ligand being recovered is 1,3-butadiene from a butadiene-containing feed stream, butadiene-1,3, itself, can be used as the stripping gas.

Stripping of the cuprous halide-organic liquid diluent slurry can be accomplished conveniently thermally by heating the complexed slurry at temperatures which are at or below, and preferably from 150 to 5° F. below, the desorption temperatures to be employed in subsequent decomplexing step. Any organic liquid diluent lost during stripping can be recovered by splitting the diluent from the stripping gas at appropriate conditions of temperature and pressure. Stripping can also be conducted by washing the stripping column counter-currently with any suitable liquid or gaseous stripping material which can include a ligand less preferentially complexable with the cuprous halide salt particles, as long as the stripping is conducted at temperatures and pressures which do not cause significant decomplexation of the previously complexed desired product ligand. The stripping can also be conducted by counter-current liquid washing or gaseous stripping using inert hydrocarbons, especially inert $C_5$ to $C_{12}$ paraffins, nitrogen, nitrogen-containing mixtures, etc. Moreover, various combinations of stripping agents can be used. Of course, if slurry stripping is conducted, the slurry stripping is always done in the presence of the organic liquid diluent as a liquid.

Thus, for example, butenes and other less complexable materials can be stripped from cuprous chloride-butadiene solid, insoluble complexed particles by contact of said particles with liquid n-pentane. Other stripping techniques can, of course, be used. When stripping less complexable feed components from cuprous chloride-butadiene particles slurried in an organic liquid diluent, butadiene gas can be bubbled through the slurry to effect stripping.

Occasionally it may be necessary to rejuvenate the concentration of contaminant-rejecting material contained in the cuprous halide-organic liquid diluent slurry. This can be accomplished readily by adding the requisite amounts (to insure the desired concentration during complexing) to the sorbent solids-diluent slurry prior to or in the slurry complexing zone, accompanied by adequate agitation of the slurry to insure uniform distribution of the contaminant-rejecting material with respect to the cuprous halide sorbent particles. Thus, additional (makeup) amounts of the contaminant-rejector can be periodically or continuously added to the cuprous halide-organic liquid slurry.

Of course, whether the complexing and desorption are conducted vapor phase or liquid phase, the desorbed cuprous halide particles can be recycled for further use in recovering selectively the product ligand from the feed stream containing it, the only essential consideration being that the requisite concentration of contaminant-rejector be uniformly distributed in close contact and intimate association with the cuprous halide sorbent particles, because it is the contaminant-rejector which excludes the unwanted close-boiling, closely co-complexable ligand from complex formation.

A wide variety of product ligands can be recovered from feed streams containing them even in comparatively low concentrations such as 15 wt. percent or lower in accordance with the present invention. Conveniently, these product ligands can be grouped into two categories, those which form stable complexes with the cuprous halide sorbents having mol ratios of greater than 1:1 and those which form stable complexes having mol ratios of copper to complexing product ligands of 1:1. Suitable exemplary 1:1 ligands (those forming a 1:1 molar complex with the selected cuprous halide sorbent) which can be recovered from feed streams containing them, include, but are not limited to the following: $C_2$ to $C_{20}$ monoolefins, such as ethylene, propylene, butenes (butene-1, butene-2 and isobutylene); styrene, vinyl toluene, vinyl cyclohexane, unsaturated aldehydes, unsaturated alcohols, unsaturated esters, unsaturated acids, e.g., allyl alcohol, acrolein, acrylic acid, methacrylic acid, $C_1$ to $C_8$ alkyl acrylates and alkyl methacrylates (methylacrylate, ethylacrylate, methyl methacrylate, ethyl methacrylate), amines, halogenated olefins, e.g., vinyl chloride, chlorobutenes, allyl halides such as allyl chloride, etc.

If, however, after long usage the sorptive activity and sorptive capacity of the slurried solids decreases to such a level as to severely restrict efficient recovery operations, the sorptive activity and capacity of the cuprous halide solids can be regenerated by complexing them with a "conditioning ligand" capable of forming a >1:1 molar complex with said cuprous halide, viz, a ligand capable of forming a stable complex wherein the complex has a mol ratio of copper to complexing ligand of greater than 1:1, followed by decomplexation thereof. This complexing and decomplexing can be done either in the vapor phase or by slurry complexing and decomplexing. The complexing operation imparts to the raw salt and requisite sorptive capacity and activity upon decomplexing thereof by creating pores in the salt. This desorption is usually conducted thermally by heating the previously complexed raw salt to thermally dissociate the complex therefrom, thus leaving the sorption-active cuprous halide sorbent particles. After this "conditioning ligand" treatment, the cuprous halide sorbent solids will have a highly porous structure, have a porosity of above about 10% (of the total volume of a particle) 550 to 10,000 A. pores, as determined by mercury porosimeter measurements. Suitable "conditioning ligands" which can be utilized usually form stable complexes having a mol ratio of copper to conditioning ligand of 2:1 or even higher, such as those exemplary conditioning ligands set forth hereinabove.

Suitable exemplary 2:1 complexable greater than 1:1 ligands (those forming a stable complex having a mol ratio of copper to product complexable ligands of greater than 1:1) which can be recovered in enhanced purity in accordance with the improved process and purity enhancing compositions of this invention include, but are not limited to, the following: any and all of the previously mentioned ligands suitable as "conditioning ligands" for preparing highly porous, sorption-active cuprous halide sorbent particles from their corresponding raw salts; halogenated conjugated or non-conjugated aliphatic, cyclic and alicyclic polyolefins, e.g., 2-chloro-1,3-butadiene, chloro and bromo piperylenes, chloro cyclohexadiene; unsaturated ethers such as divinyl ether; acetylenic halides, alcohols, acids and esters such as propargyl chloride, propargyl bromide, propargyl alcohol, propargyl acetate, propargyl acid, etc.; various nitrile substituted acids, ethers, esters, such as 2-hydroxypropronitrile, substituted unsaturated nitriles, etc.

The present invention will be disclosed in greater detail by the examples which follow. These examples are included herein to illustrate rather than limit the present invention. In the examples all percents and parts are by weight unless otherwise indicated. In all examples, except Example 5, the active sorbent material is a porous CuCl (>10% pores 550 to 10,000 A. in diameter) prepared according to procedures as outlines above.

EXAMPLE 1

Liquid n-pentane slurries containing 50 to 60 wt. percent of cuprous chloride were prepared by adding the cuprous chloride to the liquid n-pentane and stirring to agitate the slurry. In the runs containing a contaminant-rejecting material, said material was coated onto the cuprous chloride particles prior to their addition to the pentane slurry diluent. Then the butadiene-containing feed was bubbled into the cuprous chloride-n-pentane slurry and liquid phase slurry complexing was conducted at the below-noted complexing temperatures in each of Runs 1 to 22. The feed stream had the following composition, the respecting feed concentration of vinyl acetylene being tabulated individually for each run:

| Feed component: | Concentration (wt. percent) |
|---|---|
| Propane | 0.0354 |
| Propylene and isobutane | 0.7991 |
| Methane | 0.0000 |
| n-Butane | 1.3282 |
| Ethane and ethylene | 0.0000 |
| Butene-1 and isobutylene | 47.0737 |
| t-Butene-2 | 10.9564 |
| c-Butene-2 | 7.1960 |
| Butadiene-1,3 | 32.2261 |
| Methylacetylene | 0.0334 |
| Butadiene-1,2 | 0.1782 |
| Ethylacetylene | 0.0666 |
| Vinylacetylene as shown in Table I. | |

Following complexing the slurry solids were stripped with 1,3-butadiene at the below-tabulated temperatures for one hour at atmospheric pressure followed by decomplexing by heating at 150 to 165° F. for 0.1 to 1.0 hour,

TABLE I

| | Run Number | | | | | | | | |
|---|---|---|---|---|---|---|---|---|---|
| | 1 | 2 | 3 | 4 | 5 | 6 | 7 | 8 | 9 |
| Feed vinyl acetylene, p.p.m. | 9,100 | 9,100 | 9,100 | 9,100 | 9,100 | 9,100 | 9,100 | 9,100 | 5,000 |
| Complexing temp., °F. | 40 | 40 | 40 | 90 | 90 | 90 | 90 | 90 | 60 |
| Stripping temp., °F. | 130 | 130 | 130 | 130 | 130 | 130 | 130 | 130 | 130 |
| Contaminant rejecting additive | None | DMF | DMF | None | DMF | DMF | DMF | DMF | DMF |
| Additive concentration (wt. percent on cuprous chloride solids). | | 4 ( ) | 4.5 | | 1.3 | 0.3 | 1 ( ) | 2 ( ) | 3.0 |
| Percent of cuprous chloride solids complexed | 56 | 56 | 54 | 51 | 45 | 50 | 50 | 49 | 61 |
| Desorbate product (wt. percent): | | | | | | | | | |
| Vinyl acetylene, p.p.m. | 2,054 | 484 | 28 | 347 | 39 | 40 | 11 | 40 | 28 |
| Butadiene-1,3 | 99.5557 | 99.8127 | 99.9607 | 99.7833 | 99.8897 | 99.8314 | 99.8596 | 99.8947 | 99.9735 |

| | Run Number | | | | | | | | |
|---|---|---|---|---|---|---|---|---|---|
| | 10 | 11 | 12 | 13 | 14 | 15 | 16 | 17 | 18 |
| Feed vinyl acetylene, p.p.m. | 1,400 | 1,400 | 1,400 | 1,400 | 1,400 | 1,400 | 1,400 | 1,400 | 1,250 |
| Complexing temp., °F. | 40 | 40 | 40 | 60 | 60 | 60 | 90 | 90 | 50 |
| Stripping temp., °F. | 5 ( ) | 5 ( ) | 6 ( ) | 130 | 130 | 130 | 130 | 130 | 130 |
| Contaminant rejecting additive | None | DMF | DMF | None | DMF | DMF | NMP | NMF | DMF |
| Additive concentration (wt. percent on cuprous chloride solids) | 3.0 | 3.0 | 3.0 | | 1.3 | 2.7 | 0.3 | 0.3 | 1.6 |
| Percent of cuprous chloride solids complexed | N.D. | N.D. | N.D. | 63 | 61 | 46 | 52 | 46 | 67 |
| Desorbate product (wt. percent): | | | | | | | | | |
| Vinyl acetylene, p.p.m. | 207 | 10 | 3 | 1,174 | 39 | 37 | 25 | 42 | 68 |
| Butadiene-1,3 | 93.8275 | 94.0654 | 99.1684 | 99.7602 | 99.9737 | 99.9834 | 99.8522 | 99.9095 | 99.7122 |

| | Run Number | | | | | | |
|---|---|---|---|---|---|---|---|
| | 19 | 20 | 21 | 22 | 23 | 24 | 25 |
| Feed vinyl acetylene, p.p.m. | 1,100 | 1,100 | 1,100 | 1,100 | 9,100 | 9,100 | 9,100 |
| Complexing temp., °F. | 40 | 40 | 90 | 105–35 | 60 | 90 | 60 |
| Stripping temp., °F. | 130 | 130 | 130 | 130 | 130 | 130 | 130 |
| Contaminant rejecting additive | None | DMF | DMF | DMF | DMCA | DMCA | DMCCA |
| Additive concentation (wt. percent on cuprous chloride solids) | | 3 ( ) | 0.3 | 0.7 | 0.7 | 0.7 | 0.7 |
| Percent of cuprous chloride solids complexed | 59 | 55 | 50 | 63 | 61 | 50 | 62 |
| Desorbate product (wt. percent): | | | | | | | |
| Vinyl acetylene, p.p.m. | 355 | 29 | 14 | 14 | 48 | 28 | 133 |
| Butadiene-1,3 | 99.6589 | 99.8784 | 99.8884 | 99.9447 | 99.8686 | 99.9159 | 99.8805 |

1 ( ) Run 6 cuprous chloride solids recycled, no additional contaminant, rejecting material added.
2 ( ) Run 7 cuprous chloride solids recycled, no additional contaminant, rejecting material added.
3 ( ) Run 5 cuprous chloride solids recycled, no additional contaminant, rejecting material added.
4 ( ) Run 20 cuprous chloride solids recycled, no additional contaminant, rejecting material added.
5 ( ) Slurries liquid phase stripped with 1,3-butadiene at 80° F. for 60 minutes and decomplexed in complexing reactor at 200° F. with nitrogen at 0 pressure for 60 minutes.
6 ( ) Slurries liquid phase stripped with essentially pure 1,3-butadiene at 130° F. for 60 minutes and decomplexed in complexing reactor at 200° F. with nitrogen at 0 p.s.i.g.
DMF=N,N-dimethyl formamide; NMP=N-methyl pyrrolidone; NMF=N-methyl formamide; DMCA=N,N-dimethyl caproamide; N.D.=Not Determined; DMCCA=a mixture of N,N-dimethyl caprylamide and N,N-dimethyl capramide containing approximately equal weight amounts of each.

using nitrogen to aid in desorption (except as otherwise noted in Table I below). Essentially no decomplexation was conducted during stripping. The stripping was conducted by removing the complexed cuprous chloride particles from the slurry and subjecting them to the above-mentioned heating. Then the dry stripped particles were decomplexed at the temperatures noted above (except as noted in Table I). Table I summarizes data obtained from twenty-five tests showing mainly the effects of varying the vinylacetylene feed concentration, complexing temperatures, presence and absence of specific contaminant-rejecting materials, and varying the concentration of contaminant-rejecting materials.

a small amount of contaminant-rejecting additive is necessary, and that this amount decreases as the impurity concentration decreases, or the temperature increases.

TABLE III.—EFFECT OF VARYING ADDITIVE CONCENTRATIONS

| | Run Number | | | | | | | | | |
|---|---|---|---|---|---|---|---|---|---|---|
| | 1 | 2 | 3 | 4 | 5 | 6 | 7 | 8 | 9 | 10 |
| Vinyl acetylene in feed, p.p.m. | 9,100 | 9,100 | 9,100 | 14,000 | 14,000 | 14,000 | 14,000 | 14,000 | 14,000 | 14,000 |
| DMCCA [1] concentration, wt. percent on solids | None | 0.7 | 1.4 | None | 1.4 | 4 | None | 3.3 | 4 | 5 |
| Complexing temperature, °F | 90 | 90 | 60 | 90 | 90 | 90 | 60 | 60 | 60 | 60 |
| Product Purity: | | | | | | | | | | |
| 1,3-butadiene, wt. percent | 99.78 | 99.92 | 99.91 | 99.72 | 99.84 | 99.84 | 99.57 | 99.89 | 99.91 | 99.94 |
| Vinylacetylene, p.p.m. | 347 | 28 | 66 | 637 | 206 | 47 | 1,611 | 257 | 120 | 108 |

[1] N,N-dimethyl caprylamide and N,N-dimethyl capramide.

EXAMPLE 2

A cyclic complexation recovery of 1,3-butadiene was carried out using a 1-liter stirred autoclave. The complexing media was a 50 wt. percent slurry of cuprous chloride (>10 porosity) in heptane. The feed to the slurry was a $C_4$ unsaturate of the same composition as in Example 1, except that it contained 3,700 p.p.m. vinyl acetylene. In the first cycle no contaminant-rejecting material was present, while on the second, third, and fourth cycles, approximately 1 wt. percent of a mixture of N,N-dimethylcaprylamide and N,N-dimethyl capramide (DMCCA) was present, based on CuCl content.

The feed was added to the slurry, and complexation was carried out first at 90°, then at 70° F. The slurry was stripped at 130° F. and 0 p.s.i.g. for one hour with pure 1,3-butadiene, and then was decomplexed for 20 minutes at about 190° F. and 0 p.s.i.g. The slurry was cooled, and the cycle was repeated. A sample of the solids was withdrawn after stripping, and before decomplexation during each cycle. This solid was laboratory decomplexed, and the purity of the 1,3-butadiene product which was desorbed was evaluated by critical gas chromatography, with the result reported below. As shown in the third and fourth cycles, the effect of the DMCCA contaminant-rejecting additive material remains during cycling, and appears to improve, probably due to better dispersion on the solids.

TABLE II

| | Cycle | | | |
|---|---|---|---|---|
| | 1 | 2 | 3 | 4 |
| Vinylacetylene in feed, p.p.m. | 3,700 | 3,700 | 3,700 | 3,700 |
| DMCCA on solids, wt. percent | None | [1] 1.0 | 1.0 | 1.0 |
| Product Purity: | | | | |
| 1,3-butadiene, wt. percent | 99.86 | 99.88 | 99.90 | 99.97 |
| Vinylacetylene, p.p.m. | 316 | 83 | 14 | 11 |

[1] DMCCA added before cycle 2, no further addition for cycles 3 and 4.

EXAMPLE 3

This example shows the effect of additive concentrations at different temperatures and impurity concentrations in the feed.

For this series of runs, a batch complexation procedure was used, followed by laboratory decomplexation and evaluation of the purity of 1,3-butadiene product which was complexed. In each case a 50 wt. percent slurry of CuCl (>10% porosity) in heptane was used as complexing media. Complexations were carried out slurry phase at the desired temperature. The feed to the slurry was a $C_4$ unsaturated material equivalent to that in Example 1, except that it contained varying amounts of vinyl acetylene. The results given below shown that only

EXAMPLE 4

A slurry phase cyclic complexation decomplexation recovery of ethylene is carried out as in Example 2. In this case a crude ethylene stream with the composition tabulated below is fed to a 50 wt. percent slurry of CuCl (>10% porosity) in heptane at 0° F. and 90 p.s.i.g. The corresponding product composition from slurry decomplexation of the resulting ethylene complex at 80° F. and 0 p.s.i.g. is tabulated below. A second test using the same feed, with 1% N,N-dimethyl caproamide (DMCA) added to the solids is also tabulated below. This data show the effectiveness of the contaminant-rejecting additive material in lowering the product concentration of undesirable components in the separation of a 1:1 complex of CuCl.

TABLE IV

| | Feed | Cycle | |
|---|---|---|---|
| | | 1 | 2 |
| DMCA concentration, wt. percent on solids | | None | 1.0 |
| Product composition, mol percent: | | | |
| $H_2$ | 10.88 | 0.00 | 0.00 |
| $CO_2$ | 0.30 | 0.00 | 0.00 |
| $CH_4$ | 38.31 | 0.45 | 0.12 |
| $C_2H_4$ | 39.99 | 98.49 | 99.65 |
| $C_2H_6$ | 10.14 | 0.98 | 0.23 |
| $C_3+$ | 0.05 | 0.00 | 0.00 |
| Acetylene | 0.33 | 0.08 | 0.00 |

EXAMPLE 5

The procedure for Example 4 is repeated using raw, dry, commercially available cuprous chloride as the sorbent, and a slurry liquid composed of 75 wt. percent heptane and 25 wt. percent hexene-1. The CuCl sorbent complexes ethylene to a capacity of 60% of the theoretical capacity for a 1:1 CuCl:ethylene complex. A similar test without the hexene-1 present complexes to only 25–30% of the theoretical capacity.

In a third cycle, with hexene-1 present, N,N-dimethylcaproamide is added in a 1.0 wt. percent concentration based on solids. This yields an improvement in ethylene purity essentially the same as shown in Example 4.

EXAMPLE 6

A slurry phase complexation to recover propylene selectively is carried out as in Example 5. The slurry consists of a 50 wt. percent slurry of CuCl (>10% porosity) in decane. The feed to the slurry is a crude $C_3$ propylene-containing stream as shown below. Cycles are carried out at the same conditions employed in Example 5, both without benefit of a contaminant-rejecting additive, and with 2 wt. percent (based on solids) of N-methyl pyrrolidone added to the slurry. These results show the effectiveness of the additive in enhancing purity with another 1:1 complex of CuCl.

TABLE V

| | Feed | Cycle | |
|---|---|---|---|
| | | 1 | 2 |
| N-methyl pyrrolidone concentration, wt. percent on solids | | None | 2 |
| Product composition, mol Percent: | | | |
| Methyl acetylene | 0.12 | 0.10 | 0.01 |
| Allene | 0.25 | 0.15 | 0.01 |
| Propane | 37.62 | 1.32 | 0.22 |
| Propylene | 62.01 | 98.43 | 99.78 |

EXAMPLE 7

A vapor phase complexation of ethylene is carried out in a fluid bed cyclic pilot unit. In this operation fluidizable particles (avg. particle size 40μ) of CuCl (>10% porosity) are held in a vertical fluid bed. They are fluidized with the feed stream used in Example 5 at 300 p.s.i.g. and −25° F. to complex the ethylene. They are then stripped at 0° F. and 300 p.s.i.g. with pure ethylene, and finally decomplexed at 300 p.s.i.g. and 110° F. with nitrogen. Cycles are conducted both without benefit of additive, and with 05 wt. percent of a 50:50 mixture of N,N-dimethyl caprylamide and N,N-dimethyl capramide (DMCCA) present. The results tabulated below show the effectiveness of the additive in a vapor phase complexation process. In addition, the solids fluidize much better in the cycle containing the additive, indicating an added benefit for the additive in vapor phase fluid bed usage.

TABLE VI

|  | Feed | Cycle 1 | Cycle 2 |
|---|---|---|---|
| DMCCA concentration, wt. percent on solids | | None | 0.5 |
| Product composition, mol percent: | | | |
| $H_2$ | 10.88 | 0.00 | 0.00 |
| $CO_2$ | 0.30 | 0.02 | 0.00 |
| $CH_4$ | 38.31 | 0.61 | 0.05 |
| $C_2H_4$ | 39.99 | 98.13 | 99.86 |
| $C_2H_6$ | 10.14 | 1.03 | 0.09 |
| $C_{3+}$ | 0.05 | 0.00 | 0.00 |
| Acetylene | 0.33 | 0.21 | 0.00 |

EXAMPLE 8

A slurry phase complexation recovery of acrylonitrile is carried out in a one-liter stirred autoclave. A synthetic mixture containing 70 wt. percent acrylonitrile and 30 wt. percent acetonitrile is fed to a 50 wt. percent CuCl slurry in toluene at 0° F. and 0 p.s.i.g. The slurry is then concentrated, and the solids are washed three times with fresh toluene. The slurry is then heated, and the acrylonitrile is decomplexed and vaporized at the boiling point of toluene. Cycles are carried out both with no contaminant-rejecting additive present, and with 5 wt. percent of N,N-dimethyloleamide present, based on CuCl solids. The purities listed below are obtained for the acrylonitrile.

TABLE VII

|  | Cycle 1 | Cycle 2 |
|---|---|---|
| N,N-dimethyloleamide present, wt. percent on CuCl solids | None | 5 |
| Product purity, wt. percent: | | |
| Acrylonitrile | 87.2 | 98.1 |
| Acetonitrile | 12.8 | 1.9 |

EXAMPLE 9

A slurry complexation recovery of isoprene is carried out using the procedure of Example 2. The 50 wt. percent slurry of CuCl in iso-octane is treated with a crude $C_5$ isoprene containing stream, of the composition tabulated below, at 60° F. and 0 p.s.i.g. The slurry is then stripped with pure vapor isoprene at 110° F. and 0 p.s.i.g. The slurry is heated to 200° F. and decomplexed. Cycles are conducted without any contaminant-rejecting additive present, and with 0.1 wt. percent N-methyl formamide (NMF) present, based on CuCl. The results shown below show the effectiveness of the additive in securing enhanced isoprene product purity.

TABLE VIII

|  | Feed | Cycle 1 | Cycle 2 |
|---|---|---|---|
| NMF present, wt. percent on CuCl solids | | None | 0.1 |
| Product composition, wt. percent: | | | |
| Isoprene | 42.61 | 98.67 | 99.82 |
| 1,4-pentadiene | 0.37 | .21 | .04 |
| Pentene-1 | 37.92 | .75 | .13 |
| C-Pentene-2 | 4.21 | .03 | .00 |
| T-Pentene-2 | 13.36 | .11 | .01 |
| Pentane | 1.21 | .02 | .00 |
| Ethyl acetylene | 0.32 | .21 | .00 |

EXAMPLE 10

A slurry recovery of styrene was carried out using the procedure of Example 9. The slurry consisted of a 50 wt. percent slurry of CuCl in pentane. A feed stream consisting of 60 wt. percent styrene and 40 wt. percent ethyl benzene was fed to this slurry at 40° F., 0 p.s.i.g. The slurry was then washed twice countercurrently with pentane and the solids were filtered. The dry solids were heated to 200° F., and the styrene was collected as it was evolved. In one cycle no contaminant-rejecting additive was present. In a second cycle, 2 wt. percent N,N-dimethylformamide (DMF) was present during complexation. Complexation rate was five fold faster in the second cycle using the said additive, showing an added unexpected benefit for the presence of the additive. The purities of the styrene products given below show the effectiveness of the present invention in enhancing styrene purity.

TABLE IX

|  | Cycle 1 | Cycle 2 |
|---|---|---|
| DMF present, wt. percent, on solids | None | 2 |
| Product purity, wt. percent: | | |
| Styrene | 82 | 95 |
| Ethyl benzene | 18 | 5 |

What is claimed is:

1. In a sorbent-based process for selectively recovering complexable ligands capable of preferentially forming stable complexes with a cuprous halide sorbent selected from the group consisting of cuprous chloride, cuprous bromide and cuprous iodide by contact of a feed containing said ligand with said sorbent to form said ligand-sorbent complex and desorption of said complex to recover said ligand in higher purity than that present in said feed, the improvement which comprises conducting said complexing in the presence of a contaminant-rejecting material selected from the group consisting of:

(A) compounds of the formula:

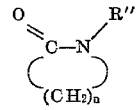

where R″ is a $C_1$ to $C_{12}$ alkyl group and $n$ is an integer of from 2 to 12;

(B) compounds of the formula:

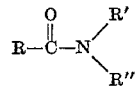

where R and R′ are selected from the group consisting of hydrogen and $C_1$ to $C_{18}$ alkyl groups and R″ is a $C_1$ to $C_{18}$ alkyl group; and (C) mixtures containing (A) and (B).

2. A process as in claim 1 wherein said complexing is conducted in the vapor phase and said cuprous halide sorbent particles have a porosity of above about 10% (of the total volume of a particle) 550 to 10,000 A. pores.

3. A process as in claim 1 wherein said contaminant-rejecting material is present in a concentration ranging from 0.001 to 10 wt. percent, based on the amount of said cuprous halide present.

4. A process as in claim 3 wherein said contaminant-rejecting material is present in a concentration ranging from 0.01 to 3 wt. percent, based on the amount of said cuprous halide present.

5. A process as in claim 1 wherein said compound (B) is a N,N-di-$C_1$ to $C_4$ alkyl amide of an alkanoic acid having from 1 to 18 carbon atoms.

6. A process as in claim 5 wherein said amide is N,N-dimethyl formamide.

7. A process as in claim 5 wherein said amide is N,N-dimethyl-caproamide.

8. A process as in claim 5 wherein said amide is a mixture of N,N-dimethyl caprylamide and N,N-dimethyl capramide.

9. A process as in claim 1 wherein said compound (A) is a N-$C_1$ to $C_4$ alkyl pyrrolidone.

10. A process as in claim 1 wherein said pyrrolidone is N-methyl pyrrolidone.

11. A process as in claim 1 wherein said ligand is one capable of forming a stable complex with said cuprous halide sorbent having a mol ratio of copper to complexing ligand of greater than 1:1.

12. A process as in claim 11 wherein said ligand is a multiolefin.

13. A process as in claim 12 wherein said multiolefin is a diolefin.

14. A process as in claim 13 wherein said diolefin is allene.

15. A process as in claim 13 wherein said diolefin is isoprene.

16. A process as in claim 13 wherein said diolefin is 1,3-butadiene.

17. A process as in claim 1 wherein said cuprous halide is cuprous chloride.

18. A process as in claim 1 wherein said ligand is one capable of forming a stable complex with said cuprous halide sorbent having a mol ratio of copper to complexing ligand of 1:1.

19. A process as in claim 18 wherein said ligand is a monoolefin.

20. A process as in claim 18 wherein said monoolefin is ethylene.

21. A process as in claim 19 wherein said monoolefin contains from 2 to 20 carbon atoms.

22. A process as in claim 21 wherein said monoolefin is a butene.

23. A process as in claim 21 wherein said monoolefin is propylene.

24. A sorbent based slurry process for recovering a complexible ligand capable of preferentially forming a stable complex with cuprous chloride sorbent which comprises (1) contacting a feed containing said ligand with an essentially anhydrous slurry of cuprous chloride solid sorbent particles in an organic liquid diluent having a boiling point higher than said preferentially complexed ligand and composed of materials less preferentially complexable with cuprous chloride than said ligand being recovered to effect liquid phase complexation of said ligand to be recovered, and (2) desorbing said complex in the presence of said organic liquid diluent to recover said preferentially complexed ligand in purified form, said slurry complexing and slurry desorption being conducted in the presence of a contaminant-rejecting material selected from the group consisting of:

(A) compounds of the formula:

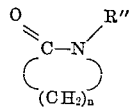

where R″ is a $C_1$ to $C_{12}$ alkyl group and $n$ is an integer of from 2 to 12;

(B) compounds of the formula:

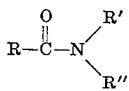

where R and R′ are selected from the group consisting of hydrogen and $C_1$ to $C_{18}$ alkyl groups and R″ is a $C_1$ to $C_{18}$ alkyl group; and (C) mixtures containing (A) and (B).

25. A process as in claim 24 wherein said organic liquid diluent contains a $C_{5+}$ paraffin.

26. A process as in claim 24 wherein said organic liquid diluent contains a $C_6$ to $C_{12}$ monocyclic aromatic having up to six alkyl substituted carbon atoms.

27. A process as in claim 24 wherein said ligand recovered selectively is a diolefin.

28. A process as in claim 27 wherein said diolefin is 1,3-butadiene.

29. A process as in claim 24 wherein said contaminant-rejecting material is present in a concentration ranging from 0.001 to 10 wt. percent, based on the amount of cuprous chloride present.

30. A process as in claim 29 wherein said contaminant-rejecting material is present in a concentration ranging from 0.01 to 3 wt. percent, based on the amount of cuprous chloride present.

31. A process as in claim 24 wherein said compound (A) is a N-$C_1$ to $C_4$ alkyl pyrrolidone.

32. A process as in claim 24 wherein said pyrrolidone is N-methyl pyrrolidone.

33. A process as in claim 24 wherein said ligand recovered selectively is a monoolefin.

34. A process as in claim 33 wherein said monoolefin is ethylene.

35. A process as in claim 33 wherein said monoolefin is propylene.

36. A process as in claim 33 wherein said organic liquid diluent contains a $C_{4+}$ monoolefin having at least two more carbon atoms than the monoolefin recovered selectively.

37. A process as in claim 24 wherein said compound (B) is a N,N-di-$C_1$ to $C_4$ alkyl amide of an alkanoic acid having from 1 to 18 carbon atoms.

38. A process as in claim 37 wherein said amide is N,N-dimethyl formamide.

39. A process as in claim 37 wherein said amide is N,N-dimethyl caproamide.

40. A process as in claim 37 wherein said amide is a mixture of N,N-dimethyl caprylamide and N,N-dimethyl capramide.

41. A process for recovering 1,3-butadiene selectively from a feed containing it along with close boiling difficult to separate butenes and vinyl acetylene which comprises (1) contacting said feed with an essentially anhydrous slurry of cuprous chloride solid sorbent particles having an average particle size ranging from 0.1 to 250 microns in a $C_5$ to $C_{12}$ inert hydrocarbon liquid diluent having a boiling point higher than 1,3-butadiene at temperature and pressure conditions sufficient to effect liquid phase complexing of 1,3-butadiene selectively with cuprous chloride and (2) desorbing said cuprous chloride-1,3-butadiene complex in the presence of said diluent to recover essentially pure 1,3-butadiene containing considerably less vinyl acetylene than present in said feed, said slurry complexing and desorption being conducted in the presence of from 0.01 to 3 wt. percent, based on the amount of cuprous chloride present, of a contaminant-rejecting material selected from the group consisting of:

(A) compounds of the formula:

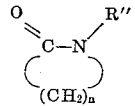

where R″ is a $C_1$ to $C_{12}$ alkyl group and $n$ is an integer of from 2 to 12;

(B) compounds of the formula:

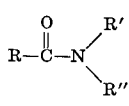

where R and R′ are selected from the group consisting of hydrogen and $C_1$ to $C_{18}$ alkyl groups and R″ is a $C_1$ to $C_{18}$ alkyl group; and (C) mixtures containing (A) and (B).

42. A process as in claim 41 which includes stripping butenes from said slurry in the presence of said insert hydrocarbon diluent and said composition after complexing but prior to desorption.

43. A process as in claim 42 wherein at least a portion of said stripping is conducted using 1,3-butadiene as stripping gas.

44. A process as in claim 41 wherein said inert hydrocarbon diluent is a $C_5$ to $C_7$ paraffin.

45. A process as in claim 41 wherein said inert hydrocarbon diluent is a $C_6$ to $C_{12}$ monocyclic aromatic hydrocarbon containing up to six alkyl substituent carbon atoms.

46. A process as in claim 41 wherein said compound (B) is a N,N-di-$C_1$ to $C_4$ alkyl amide of an alkanoic acid having from 1 to 18 carbon atoms.

47. A process as in claim 46 wherein said amide is N,N-dimethyl formamide.

48. A process as in claim 46 wherein said amide is N,N-dimethyl caproamide.

49. A process as in claim 46 wherein said amide is a mixture of N,N-dimethyl caprylamide and N,N-dimethyl capramide.

50. A process as in claim 41 wherein said compound (A) is a N-$C_1$ to $C_4$ alkyl pyrrolidone.

51. A process as in claim 50 wherein said pyrrolidone is N-methyl pyrrolidone.

References Cited
UNITED STATES PATENTS

| | | | |
|---|---|---|---|
| 3,409,692 | 11/1968 | Long et al. | 260—677 |
| 3,410,924 | 11/1968 | Fasce | 260—677 |
| 3,411,871 | 11/1968 | Bauch et al. | 23—97 |
| 3,412,172 | 11/1968 | De Feo et al. | 260—681.5 |

DELBERT E. GANTZ, Primary Examiner

G. E. SCHMITKONS, Assistant Examiner

U.S. Cl. X.R.

260—465.9, 666, 669, 674, 681.5